T. A. EDISON.
ELECTRODE ELEMENT FOR STORAGE BATTERIES.
APPLICATION FILED FEB. 6, 1908.

940,635.

Patented Nov. 16, 1909.

Witnesses:
Frank D. Lewis
Herbert H. Dyke

Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

ELECTRODE ELEMENT FOR STORAGE BATTERIES.

940,635.     Specification of Letters Patent.     Patented Nov. 16, 1909.

Original application filed November 2, 1905, Serial No. 285,650. Divided and this application filed February 6, 1908. Serial No. 414,574.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Electrode Elements for Storage Batteries, of which the following is a description.

My invention relates to an improved electrode element for storage batteries, the present case being a division of my application filed November 2, 1905, Serial No. 285,650, which has become Patent No. 880,978, March 3, 1908.

My object is to provide a perforated tubular normally non-deformable electrode element, containing active material maintained under pressure therein, and which shall be very strong and rigid, and capable of withstanding enormous bursting strains.

In order that the invention may be better understood, attention is directed to the accompanying drawing, forming part of this specification, and in which—

Figure 1:
Figure 2:
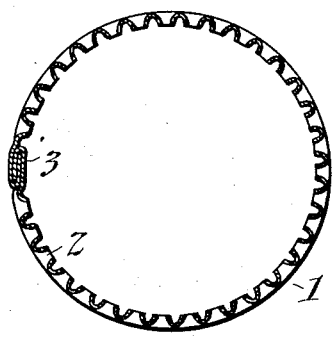

Figure 1 is a side view of the improved electrode element; and Fig. 2 a cross-sectional view of the same on an enlarged scale, and with the active material removed. In both of these views, corresponding parts are represented by the same numerals of reference.

Each electrode element 1, is composed of a tube made preferably of a strip of steel about .004 of an inch in thickness, each tube being of a length of about 4 inches, and of an internal diameter of about ¼ inch. The strip, before being formed into tubular shape, is provided with closely arranged perforations 2 therein, as shown. The joint 3 of each tube is of any suitable character, a flattened double lapped joint being shown. In order to secure greater strength to permit the tube to resist enormous bursting strains, the joint 3 extends spirally with relation to the tube. The active material 4 (appearing through the perforations 2 in Fig. 1) is introduced within the tube in any suitable way under great pressure, and the ends 5 are turned over, as shown. In order to further strengthen the tubes, I preferably provide them with a number of seamless nickel rings 6, fitting the tubes snugly.

Having now described my invention, what I claim as new and desire to secure by Letters Patent is as follows:—

1. An electrode element comprising a perforated tubular inclosing pocket composed of a strip of steel, non-deformable under normal working conditions, containing a highly compressed mass of active material, and formed with a spirally arranged joint, substantially as and for the purposes set forth.

2. An electrode element comprising a perforated tubular inclosing pocket composed of a strip of steel, non-deformable under normal working conditions, containing a highly compressed mass of active material, and formed with a spirally arranged joint, and provided with a series of encircling rings, substantially as and for the purposes set forth.

This specification signed and witnessed this 4th day of Feby. 1908.

THOS. A. EDISON.

Witnesses:
    ANNA R. KLEHM,
    FRANK L. DYER.